United States Patent
Lee et al.

(10) Patent No.: US 9,108,615 B2
(45) Date of Patent: Aug. 18, 2015

(54) MULTIMODE CLUTCH FOR A PARALLEL HYBRID VEHICLE

(71) Applicant: BorgWarner, Inc., Auburn Hills, MI (US)

(72) Inventors: Brett J. Lee, Southfield, MI (US); Christopher E. Blair, Fenton, MI (US); Christopher A. Spangler, Rochester Hills, MI (US); Mitsuru Ishihara, Novi, MI (US)

(73) Assignee: BorgWarner Inc., Auburn Hills, MI (US)

( * ) Notice: Subject to any disclaimer, the term of this patent is extended or adjusted under 35 U.S.C. 154(b) by 42 days.

(21) Appl. No.: 14/031,765

(22) Filed: Sep. 19, 2013

(65) Prior Publication Data

US 2015/0080174 A1 Mar. 19, 2015

(51) Int. Cl.
*F16H 3/72* (2006.01)
*B60W 10/02* (2006.01)
*B60W 20/00* (2006.01)

(52) U.S. Cl.
CPC ............ *B60W 10/02* (2013.01); *B60W 20/40* (2013.01); *Y10S 903/902* (2013.01)

(58) Field of Classification Search
CPC ............................. B60W 10/02; B60W 20/40
USPC ........ 475/5, 292, 297; 192/43.1, 46, 69.1, 44, 192/89.21, 93 R; 477/5
See application file for complete search history.

(56) References Cited

U.S. PATENT DOCUMENTS

| | | | |
|---|---|---|---|
| 6,062,361 A | 5/2000 | Showalter | |
| 6,092,634 A | 7/2000 | Kremer et al. | |
| 6,290,044 B1 | 9/2001 | Burgman et al. | |
| 6,745,880 B1 | 6/2004 | Yuergens | |
| 6,814,201 B2 | 11/2004 | Thomas | |
| 6,832,674 B2 | 12/2004 | Blair et al. | |
| 7,766,790 B2 * | 8/2010 | Stevenson et al. | 477/8 |
| 7,770,678 B2 * | 8/2010 | Nozaki et al. | 180/65.6 |
| 7,878,281 B2 * | 2/2011 | Tanishima | 180/65.265 |
| 8,051,959 B2 | 11/2011 | Eisengruber | |
| 8,506,449 B2 * | 8/2013 | Yoshida et al. | 477/5 |
| 8,602,187 B2 * | 12/2013 | Prout | 192/43.1 |
| 8,622,186 B2 * | 1/2014 | Samie et al. | 192/85.48 |
| 8,899,395 B2 * | 12/2014 | Holmes | 192/43.1 |
| 2006/0278487 A1 * | 12/2006 | Pawley et al. | 192/43.1 |

(Continued)

OTHER PUBLICATIONS

Green Car Congress: *Infiniti M35 Hybrid Features Original 1 Motor/2 Clutch Parallel Hybrid System*; webpage, pp. 1-2; Aug. 28, 2013; www.greencarcongress.com/2010/03/m35-20100304.html.

(Continued)

*Primary Examiner* — David J Hlavka
(74) *Attorney, Agent, or Firm* — Miller, Matthias & Hull LLP (57) ABSTRACT

In a parallel hybrid vehicle having and internal combustion engine and an electric motor operatively connected to a transmission shaft, a multimode mechanical clutch selectively couples an output shaft of the internal combustion engine to the transmission shaft. The multimode clutch has a two-way unlocked mode where the output shaft and transmission shaft can rotate independently in either direction, and a one-way locked, one-way unlocked mode where the shafts are locked to rotate together in one direction and unlocked for independent rotation in the opposite direction. The clutch may also have a two-way locked mode where the shafts rotate together in both directions. Pawls may be provided to engage and disengage as needed to execute the modes of the multimode clutch actuator.

14 Claims, 4 Drawing Sheets

(56) References Cited

U.S. PATENT DOCUMENTS

| | | | |
|---|---|---|---|
| 2007/0278022 A1* | 12/2007 | Tanishima | 180/65.2 |
| 2012/0202646 A1* | 8/2012 | Suzuki et al. | 477/5 |
| 2012/0231913 A1* | 9/2012 | Samie et al. | 475/5 |
| 2013/0310216 A1* | 11/2013 | Kamiya et al. | 477/5 |

OTHER PUBLICATIONS

Nissan Motor Company; *FR Hybrid System (Intelligent Dual Clutch Control)—Hybrid System for Front-Engine Rear-Wheel-Drive Vehicles Achieving Fuel Consumption of a Compact Car with Good Acceleration*; webpage; pp. 1-3; August 28, 2013; www.nissan-global.com/EN/TECHNOLOGY/OVERVIEW/hybrid_system.html.

BorgWarner; "*One-Way Clutch Design Guide: Types, Selection, Applications*"; pp. 4-9; copyright 1978; published in the United States in 1978.

Infiniti; "*Infiniti—New Hybrid System*", powerpoint; undated; http://www.infinitipress.eu/Documents/Powerpoints/INFINITI%20HYBRID%20PRESENTATION.pdf.

* cited by examiner

MULTIMODE CLUTCH FOR A PARALLEL HYBRID VEHICLE

TECHNICAL FIELD

This disclosure relates generally to parallel hybrid vehicles having a combustion engine, an electric motor and a disconnect device, and in particular to a parallel hybrid vehicle having a multimode mechanical clutch coupling the combustion engine to the gearbox and transmission.

BACKGROUND

Figure 1:
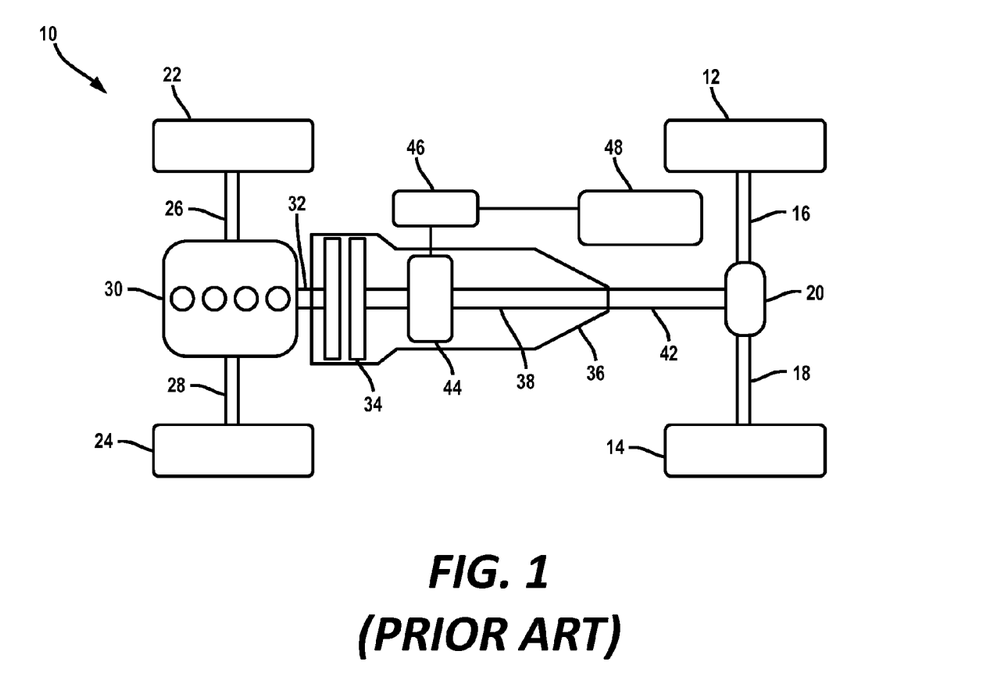
FIG. 1 is a schematic illustration of a presently known parallel hybrid vehicle having a friction clutch connecting an internal combustion engine to a transmission.

Parallel hybrid vehicles include both a combustion engine and an electric motor that can be selectively coupled to a gearbox or transmission of the vehicle and to the driven wheels. FIG. 1 is a schematic illustration of an exemplary parallel hybrid vehicle 10 known in the art. The parallel hybrid vehicle 10 includes a pair of driven wheels 12, 14 connected via axles 16, 18 to a differential 20, and a pair of non-driven wheels 22, 24 mounted on axles 26, 28. Depending on the particular vehicle 10, the driven wheels 12, 14 may be either the front wheels or the rear wheels of the vehicle 10. An internal combustion engine 30 has an output shaft 32 connected to a friction clutch 34 at one end of a transmission or gearbox 36. A transmission shaft and internal gearing 38 of the transmission 36 connect the friction clutch 34 to the differential 20 by a drive shaft 42. The electrical components of the drive mechanism for the parallel hybrid vehicle 10 include an electric motor 44 connected to the transmission shaft 38 to provide power to the driven wheels 12, 14 along with or as an alternative to the internal combustion engine 30, and also connected to an inverter 46 the transfers electrical power between the electric motor 44 and a battery 48.

In the parallel hybrid vehicle 10 of FIG. 1, the combustion engine 30 and the electric motor 44 can be selectively coupled to the gearbox 38 and then to the driven wheels 12, 14 by the friction clutch 34. The friction clutch 34 is operated according to the driving situation of the vehicle 10 to utilize the internal combustion engine 30 and the electric motor 44 in different ways. For example, when driving in urban areas, the friction clutch 34 may be closed or engaged to connect the internal combustion engine 30 to the transmission shaft 38 so that power from the engine 30 is delivered to the drive shaft 42. At the same time, the motor 44 may be controlled to provide additional power to the drive shaft 42, or to use the power supplied by the electric engine 30 to recharge the battery 48. In other urban situations, the friction clutch 34 may be opened to disconnect the engine 30 from the transmission shaft 38, and power from the battery 48 is used by the motor 44 to drive the vehicle 10. During that situation, the engine 30 may be completely stopped to conserve gasoline. During acceleration of the vehicle 10, the friction clutch 34 may be re-engaged for more responsive acceleration using power from both the engine 30 and the motor 44. In contrast, the friction clutch 34 may be opened to disconnect the engine 30 from the transmission shaft 38 during deceleration so that the motor 44 can efficiently recharge the battery 48 without power loss due to engine friction.

Under the presently known arrangements of the friction clutch 34 in parallel hybrid vehicles 10, the friction clutch 34 in its closed position locks the output shaft 32 and the transmission shaft 38 for rotation together in either direction. In the open position of the friction clutch 34, the output shaft 32 and the transmission shaft 38 are free to rotate relative to each other in either direction. This arrangement can cause inefficiencies in operation of the parallel hybrid vehicles 10. When the friction clutch 34 is engaged for driving the vehicle 10 under the power of the engine 30 in urban areas or while the vehicle 10 is accelerating under the combined power of the engine 30 and the electric motor 44, easing off the gas and slowing the engine 30 can cause rotating losses as the output shaft 32 slows and the transmission shaft 38 correspondingly slows due to the connection provided by the friction clutch 34, unless the friction clutch 34 is actuated to open and disconnect the engine 30 from the transmission 36. If the friction clutch 34 remains closed, the engine rotating losses will be incurred, which may be desired in vehicles 10 where engine breaking is desirable. If the friction clutch 34 is actuated to disconnect the engine 30, the engine rotating losses may be avoided, but open friction clutch rotating losses remain because the relatively large surface area of the facing clutch plate is subjected oil shear resulting in viscous drag. Additionally, the friction clutch 34 must be reclosed when the engine 30 is called upon to provide power to the driven wheels 12, 14. The former option, i.e. leaving the friction clutch 34 closed, may negate the efficiencies sought to be achieved by the hybrid vehicle 10. The latter option, i.e., opening and closing the friction clutch 34, still may negate the efficiencies sought to be achieved due to the viscous drag and corresponding open clutch rotating losses, as well as increase the duty cycle for the actuation mechanism of the friction clutch 34, thereby potentially shortening the lift cycle of the friction clutch 34. In view of this, a need exists for an improved strategy for switching between the power sources of a parallel hybrid vehicle that may further increase the energy efficiency of the hybrid vehicle without unnecessarily increasing rotating losses and the wear and tear on the components in the transmission system of the vehicle.

SUMMARY OF THE DISCLOSURE

In one aspect of the present disclosure, a hybrid vehicle is disclosed. The hybrid vehicle includes a driven wheel, a transmission shaft operatively connected to the driven wheel to cause the drive wheel to rotate in response to rotation of the transmission shaft, an electric motor operatively connected to the transmission shaft and selectively actuatable to provide power to rotate the transmission shaft, an internal combustion engine having an output shaft, and a multimode clutch operatively connected to the transmission shaft and the output shaft of the internal combustion engine. The multimode clutch has a first mode wherein the multimode clutch allows the output shaft and the transmission shaft to rotate independently of each other in both directions, and a second mode wherein the multimode clutch operatively couples the output shaft to the transmission shaft so that the output shaft and the transmission shaft rotate together in one direction and allows the output shaft and the transmission shaft to rotate independently of each other in the other direction.

In another aspect of the present disclosure, a hybrid vehicle is disclosed. The hybrid vehicle includes a driven wheel, a transmission shaft operatively connected to the driven wheel to cause the drive wheel to rotate in response to rotation of the transmission shaft, an electric motor operatively connected to the transmission shaft and selectively actuatable to provide power to rotate the transmission shaft, an internal combustion engine having an output shaft, and a multimode clutch. The multimode clutch includes a first race defining an axis and including a plurality of circumferentially spaced pawl apertures, wherein one of the output shaft and the transmission shaft is operatively connected to the first race for rotation therewith, a second race radially disposed about the same axis, and extending circumferentially about the axis, wherein the other one of the output shaft and the transmission shaft is operatively connected to the second race for rotation therewith, opposed pairs of pawls supported within the plurality of circumferentially disposed pawl apertures, the pawls being angularly movable within the pawl apertures, and an actuator cam situated orthogonally to the axis, and adapted for limited angular movement about the axis. In a first selectable actuator cam position corresponding to a first mode of the multimode clutch, the actuator cam engages the pairs of opposed pawls to prevent the pawls from engaging the second race and permit the first race to rotate in both a first rotational direction and a second rotational direction independent of the second race. In a second selectable actuator cam position corresponding to a second mode of the multimode clutch, rotation of the first race in the first rotational direction causes a first of the pairs of opposed pawls to engage the second race and thereby lock the first race and the second race together for rotation in the first rotational direction, and the actuator cam engages a second of the pairs of opposed pawls to prevent the pawls from engaging the second race and permit the first race to rotate in the second rotational direction independent of the second race. In a third selectable actuator cam position corresponding to a third mode of the multimode clutch, rotation of the first race in the first rotational direction causes a first of the pairs of opposed pawls to engage the second race and thereby lock the first race and the second race together for rotation in the first rotational direction, and rotation of the first race in the second rotational direction causes a second of the pairs of opposed pawls to engage the second race and thereby lock the first race and the second race together for rotation in the second rotational direction. The hybrid vehicle further includes a multimode clutch actuator operatively connected to the actuator cam and configured to selectively place the actuator cam in the first selectable actuator cam position, the second selectable actuator cam position and the third selectable actuator cam position, and a controller operatively connected to the electric motor and the multimode clutch actuator, the controller being configured to transmit clutch mode control signals to the multimode clutch actuator to cause the multimode clutch actuator to place the actuator cam in the first selectable actuator cam position, the second selectable actuator cam position and the third selectable actuator cam position.

In a further aspect of the present disclosure, a hybrid vehicle is disclosed. The hybrid vehicle includes a driven wheel, a transmission shaft operatively connected to the driven wheel to cause the drive wheel to rotate in response to rotation of the transmission shaft, an electric motor operatively connected to the transmission shaft and selectively actuatable to provide power to rotate the transmission shaft, an internal combustion engine having an output shaft, and a multimode clutch. The multimode clutch includes a first race defining an axis, wherein one of the output shaft and the transmission shaft is operatively connected to the first race for rotation therewith, a second race radially disposed about the same axis, and extending circumferentially about the axis, wherein the other one of the output shaft and the transmission shaft is operatively connected to the second race for rotation therewith, opposed pairs of pawls operatively connected to the first race and being movable relative to the first race, and an actuator cam adapted for movement relative to the second race. In a first selectable actuator cam position corresponding to a first mode of the multimode clutch, the actuator cam engages the pairs of opposed pawls to prevent the pawls from engaging the second race and permit the first race to rotate in both a first rotational direction and a second rotational direction independent of the second race. In a second selectable actuator cam position corresponding to a second mode of the multimode clutch, rotation of the first race in the first rotational direction causes a first of the pairs of opposed pawls to engage the second race and thereby lock the first race and the second race together for rotation in the first rotational direction, and rotation of the first race in the second rotational direction causes a second of the pairs of opposed pawls to engage the second race and thereby lock the first race and the second race together for rotation in the second rotational direction.

Additional aspects are defined by the claims of this patent.

DETAILED DESCRIPTION

Although the following text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term is expressly defined in this patent using the sentence "As used herein, the term "________" is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

Figure 2:
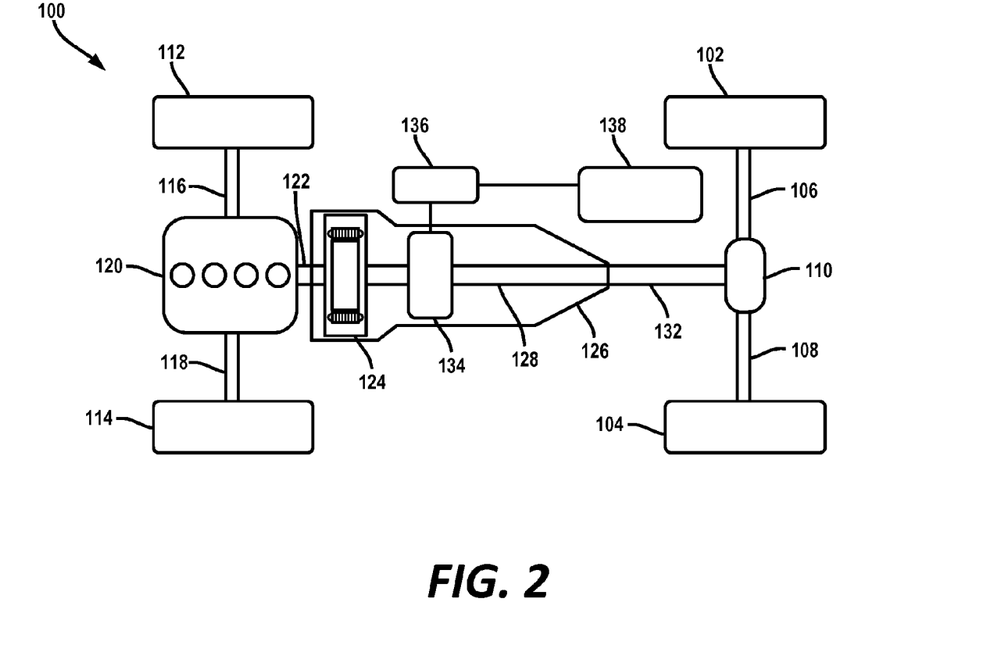
FIG. 2 is a schematic illustration of a parallel hybrid vehicle in accordance with the present disclosure having a multimode mechanical clutch connecting an internal combustion engine to a transmission.

FIG. 2 is a schematic illustration of an embodiment of a parallel hybrid vehicle 100 in accordance with the present disclosure. The parallel hybrid vehicle 100 is generally similar to the parallel hybrid vehicle 10 discussed above and includes a pair of driven wheels 102, 104 connected via axles 106, 108 to a differential 110, and a pair of non-driven wheels 112, 114 mounted on axles 116, 118. The driven wheels 102, 104 may be either the front wheels or the rear wheels of the vehicle 100. An internal combustion engine 120 has an output shaft 122 connected to a multimode clutch 124 at one end of a transmission or gearbox 126. The multimode clutch 124 and its operation are discussed in greater detail hereinafter. A transmission shaft and internal gearing 128 of the transmission 126 connect the multimode clutch 124 to the differential 110 by a drive shaft 132. The parallel hybrid vehicle 100 further includes an electric motor 134 connected to the transmission shaft 128 to provide power to the driven wheels 102, 104 along with or as an alternative to the internal combustion engine 120, and also connected to an inverter 136 that transfers electrical power between the electric motor 134 and a battery 138.

Figure 3:
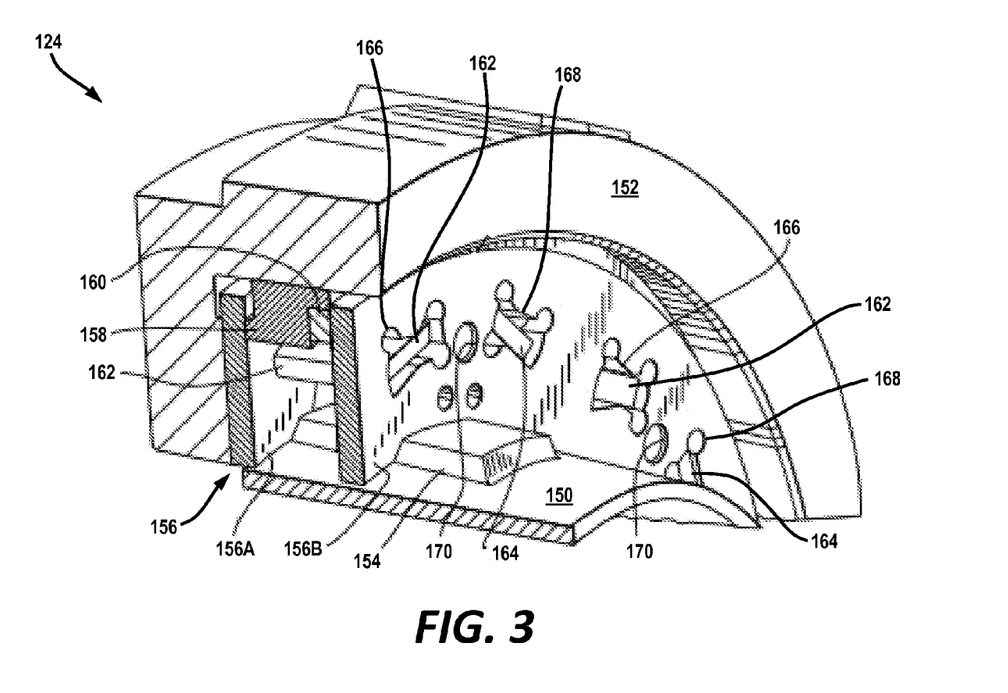
FIG. 3 is both a perspective and a cross-sectional view of a portion of one possible embodiment of a multimode clutch schematically depicted in the parallel hybrid vehicle of FIG. 2.

Referring now to FIG. 3, the multimode clutch 124 of the parallel hybrid vehicle 100 may be utilized in lieu of the friction clutch 34 described above in the parallel hybrid vehicle 10. The multimode clutch 124 may be of the type illustrated and described in U.S. Prov. Appl. Ser. No. 61/758,356 filed on Jan. 30, 2013 by Papania, entitled "Multi-Mode Clutch Module," which is expressly incorporated by reference herein. In the illustrated embodiment, the multimode clutch 124 may incorporate an interior driven hub 150 that may be operatively connected to the output shaft 122 of the internal combustion engine 120 for rotation therewith, and an outer housing 152 that may be operatively connected to the transmission shaft 128 for rotation therewith. Those skilled in the art will understand that, alternatively, the driven hub 150 may be operatively connected to the transmission shaft 128 and the outer housing 152 may be connected to the output shaft 122. The driven hub 150 may contain an array of circumferentially spaced cogs 154 adapted to secure a first inner race 156 to the driven hub 150 for rotation therewith. As disclosed, the inner race 156 is comprised of first and second spaced inner race plates 156A, 156B. A second outer race 158 sandwiched between the pair of inner race plates 156A, 156B, is situated so as to allow for relative rotation between inner race 156 and the outer race 158, and with the outer race 158 being operatively coupled to the outer housing 152 for rotation therewith.

In the present design of the multimode clutch 124, an actuator cam 160 is interposed between one of the inner race plates 156A, 156B and the outer race 158 for rotation over a predetermined angle about a common axis of the driven hub 150 and the outer housing 152 to control movements of pairs of opposed pawls 162, 164 as will be described further hereinafter. The sets of pawls 162, 164 are trapped, and hence retained, between the inner race plates 156A, 156B to allow limited angular movements of the pawls 162, 164 held within bowtie-shaped apertures 166, 168, respectively, subject to the control of the actuator cam 160. In each set, the combined pawl 162 and corresponding aperture 166 is similar to but oppositely oriented to the combined pawl 164 and corresponding aperture 168. The elements of the multimode clutch 124 are contained within the outer housing 152. A plurality of spaced apertures 170 are adapted to accommodate rivets (not shown) for providing fixed and rigid securement of each of the inner race plates 156A and 156B relative to the other.

Figure 4:
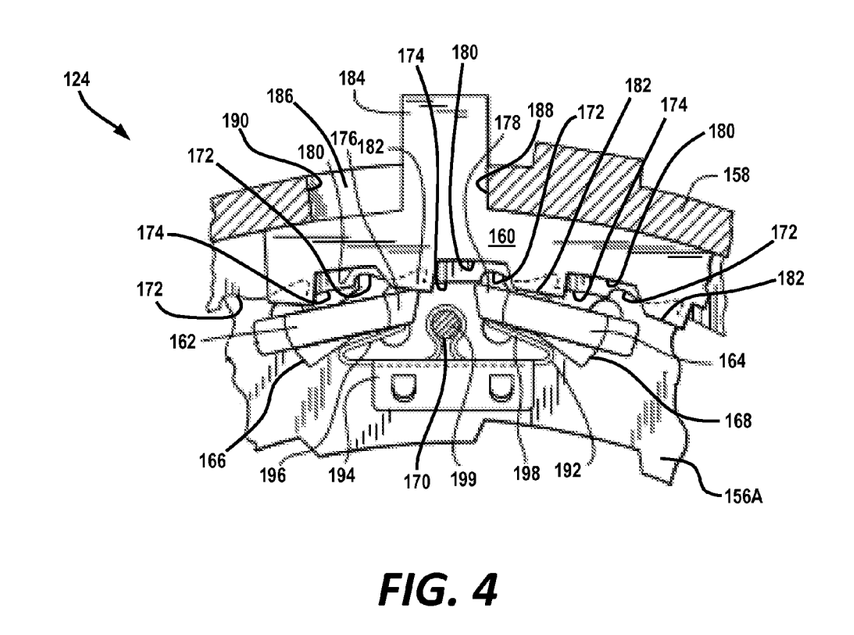
FIG. 4 is an enlarged side view of a portion of one possible embodiment of the multimode clutch of FIG. 3 with the near inner race plate removed to reveal the internal components, and with an actuator cam in a one-way locked, one-way unlocked position.
Figure 5:
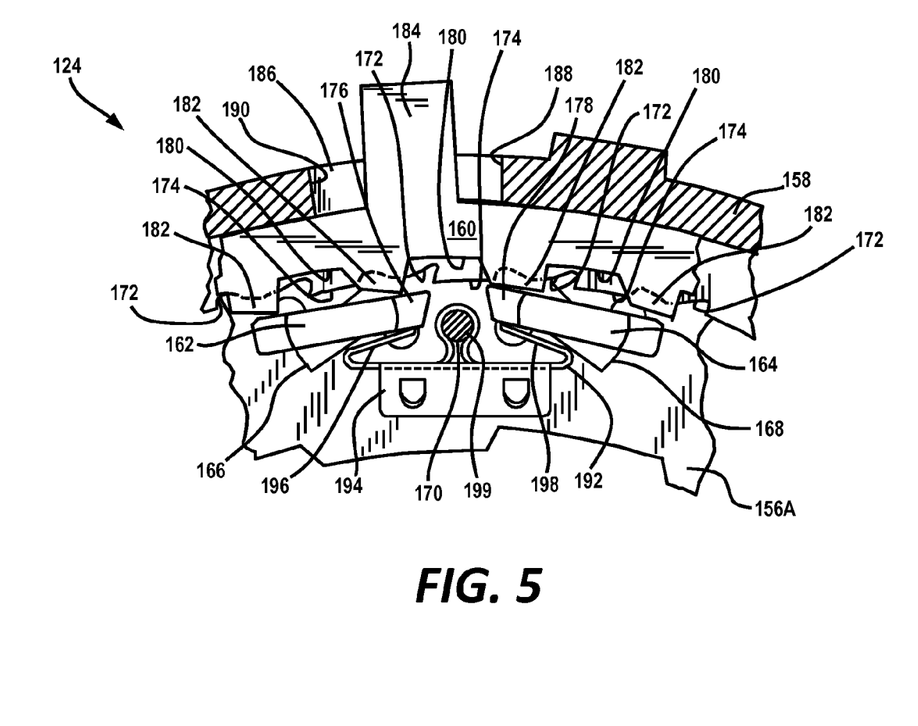
FIG. 5 is the enlarge view of one possible embodiment of the multimode clutch of FIG. 4 with the actuator cam in a two-way unlocked position.
Figure 6:
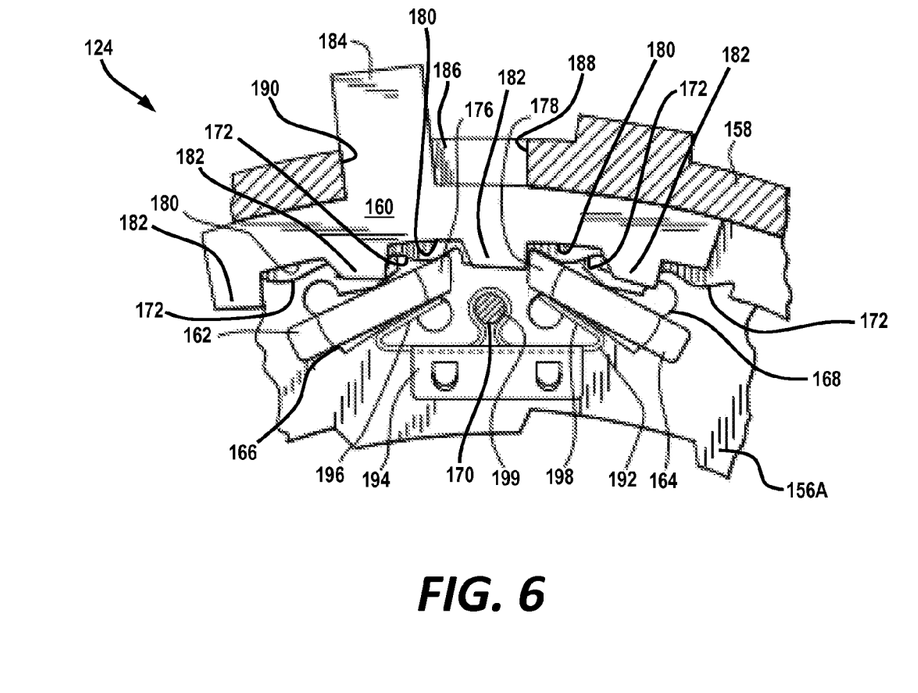
FIG. 6 is the enlarge view of the multimode clutch of FIG. 4 with the actuator cam in a two-way locked position.

The operational components of the multimode clutch 124 are illustrated in FIGS. 4-6 that illustrate the various operational modes of the multimode clutch 124 for controlling the relative rotation between the output shaft 122 of the engine 120 and the transmission shaft 128. Referring first to FIG. 4, the outer race 158 is configured to accommodate interactions with the pawls 162, 164 by providing the inner circumference of the outer race 158 with circumferentially spaced notches 172, each defined by and positioned between pairs of radially inwardly projecting cogs 174. The notches 172 and cogs 174 are configured so that, in the absence of the actuator cam 160, a toe end 176 of each pawl 162 enters one of the notches 172 and is engaged by the corresponding cog 174 when the driven hub 150 and the inner race 156 rotate in a clockwise direction as viewed in FIG. 4 relative to the outer housing 152 and the outer race 158 to cause the output shaft 122 and transmission shaft 128 to rotate together. Similarly, a toe end 178 of each pawl 164 enters one of the notches 172 and is engaged by the corresponding cog 174 when the driven hub 150 and the inner race 156 rotate in a counterclockwise direction relative to the outer housing 152 and the outer race 158 to cause the output shaft 122 and transmission shaft 128 to rotate together.

Within its interior periphery, the actuator cam 160 incorporates a strategically situated array of circumferentially spaced recesses, herein called slots 180, defined by and situated between projections, herein called cam teeth 182. The slots 180 and cam teeth 182 are adapted to interact with the pawls 162, 164 to control their movement within the apertures 166, 168, respectively, and disposition within the notches 172 and engagement by the cogs 174 as will be described. The actuator cam 160 may further include an actuator tab 184 or other appropriate member or surface that may be engaged by an actuator device (not shown) that is capable of causing the actuator cam 160 to move through its rotational range to the positions shown in FIGS. 4-6. The actuator device may be any appropriate actuation mechanism capable of moving the actuator cam 160, such as a hydraulic actuator such as that shown in the Papania reference cited above, a solenoid actuator, a pneumatic actuator or other appropriate device operatively coupled to the actuator cam and capable of rotating the actuator cam 160 to multiple positions. In the illustrated embodiment, the actuator tab 184 may be disposed within a slot 186 through the outer race and the rotation of the actuator cam 160 may be limited by a first limit surface 188 engaging the actuator tab 184 at the position shown in FIG. 4 and a second limit surface 190 engaging the actuator tab 184 at the position shown in FIG. 6.

The pawls 162, 164 are asymmetrically shaped, and reversely identical. Each of the opposed pawls 162, 164 is movably retained within its own bowtie-shaped pawl aperture 166, 168, respectively, of the inner race plates 156A and 156B. The toe end 176, 178 of each individual pawl 162, 164, respectively, is urged radially outwardly via a spring 192. Each spring 192 has a base 194, and a pair of spring arms 196 and 198. The spring arms 196 bear against the bottoms of the pawls 162, while the spring arms 198 bear against the bottoms of the pawls 164, each to urge respective toe ends 176, 178 into engagement with the cogs 174 of the outer race 158 when not obstructed by the cam teeth 182 of the actuator cam 160. It will be appreciated from FIG. 4 that axially extending rivets 199 are used to secure the inner race plates 156A, 156B together. The rivets 199 extend through the apertures 170 in each of the inner race plates 156A, 156B to hold the inner race plates 156A, 156B rigidly together, and to thus assure against any relative rotation with respect to the inner race plates 156A, 156B. In lieu of the rivets 199, other structural fasteners may be employed within the scope of this disclosure to secure the inner race plates 156A, 156B.

It will be appreciated that the actuator mechanism ultimately controls the actuator tab 184 which, in turn, moves the actuator cam 160 between multiple distinct angular positions.

Thus, the positioning of the pawls 162, 164 as axially retained between the riveted inner race plates 156A, 156B is directly controlled by the actuator cam 160 against forces of springs 192. In FIG. 4, the actuator tab 184 is shown positioned by the actuator mechanism in a first, angularly rightward selectable position, representative of a first, one-way locked, one-way unlocked or open mode. In this position, the slots 180 and cam teeth 182 of the actuator cam 24 are positioned so that the toe ends 176 of the pawls 162 are blocked by cam teeth 182 from engagement with notches 172, and hence with the cogs 174 on the interior of the outer race 158. As such, the inner race 156 is enabled to freewheel relative to the outer race 158, and to thus provide for an overrunning condition when the inner race 156 and the driven hub 150 are rotating clockwise relative to the outer race 158 and the outer housing 152. Conversely, however, the position of the actuator cam 160 allows of the toe ends 178 of the pawls 164 to enter the slots 180 of the actuator cam 24 due to the biasing force of the spring arms 198, and to thereby directly engage the cogs 174 of the outer race 158 to lock the inner race 156 and the outer race 158 together whenever the inner race 156 and the driven hub 150 undergo a driving, or counterclockwise rotational movement, thereby causing the driven hub 150 and the outer housing 152 to rotate together.

FIG. 5 illustrates the actuator tab 184 placed by the actuator mechanism in a second, intermediate selectable position, representative of a two-way unlocked or open mode of the multimode clutch 124. In this position, the slots 180 and the cam teeth 182 of the actuator cam 160 are positioned to prevent the toe ends 176, 178 of both pawls 162, 164 from entering the slots 180 of the actuator cam 160, and to maintain disengagement from the cogs 174 of the outer race 158. With the pawls 162, 164 blocked from engagement with the cogs 174, the inner race 156 and the driven hub 150 are enabled to freewheel relative to the outerrace 158 and the outer housing 152 during relative rotation in either the clockwise or the counterclockwise direction.

In FIG. 6, the actuator tab 184 is shown in a third, angularly leftward selectable position, representative of a two-way locked mode of the multimode clutch 124. In this configuration, the actuator cam 160 is positioned so that the toe ends 176, 178 of both pawls 162, 164 enter the slots 180 of the actuator cam 160 under the biasing forces of the spring arms 196, 198, respectively, and are engaged by the cogs 174 of the outer race 158 as described above to lock the inner race 156 and the driven hub 150 to the outer race 158 and the outer housing 152 for rotation therewith, irrespective of the rotational direction of the inner race 156 and the driven hub 150. Even though one specific embodiment of the multimode clutch 124 is illustrated and described herein, those skilled in the art will understand that alternative configurations of multimode clutches are possible that provide operational modes or positions in addition to two-way locked and two-way unlocked modes, including one-way lock, one-way unlocked modes, and the implementation of such alternative multimode clutches in parallel hybrid vehicles 100 in accordance with the present disclosure is contemplated by the inventors.

The configuration of the multimode clutch 124 illustrated and described herein is exemplary, and those skilled in the art will understand that alternative configurations of the multimode clutch 124 may be implemented in vehicles 100 and are contemplated by the inventors. For example, depending on the operating requirements for the vehicle 100, various combinations of the illustrated modes of FIGS. 4-6 may be implemented by changing the configurations of the actuator cam 160 and/or the notches 172 and cogs 174 of the outer race 158. For example, the vehicle requirements may not require both the one-way locked, one-way unlocked mode of FIG. 4 and the two-way locked mode of FIG. 6. In such cases, the cam teeth 182 and actuator tabs 184 may be reconfigured to place the multimode clutch (124) in the two-way unlocked mode of FIG. 5 and the required one of the modes of FIGS. 4 and 6. Moreover, it may be necessary or desired to provide separate one-way locked, one-way unlocked modes of FIG. 5 for both directions of rotation so that in one mode the pawls 162 engage the outer race 158 when the inner race 156 rotates clockwise as viewed in the drawing figures, and in another mode the pawls 164 engage the outer race 158 when the inner race 156 rotate counterclockwise.

Additionally, the relationships between the inner race 156, the outer race 158 and the pawls 162, 164 may be varied as necessary to alternatively lock and unlock the inner race 156 and the outer race 158. For example, the apertures 166, 168 and, correspondingly the pawls 162, 164, may be positioned on the outer race 158, and the inner race 156 may be provided with corresponding structures for engaging the pawls 162, 164 when necessary to lock the inner race 156 and the outer race 158. Moreover, it is contemplated that the pawls 162, 164 may be capable of moving through alternative paths of motion into and out of engagement with their corresponding locking structures, with the actuator cam 160 and multimode clutch actuator 220 being configured as necessary to move the pawls 162, 164 along the required paths of motion. For example, the pawls 162, 164 could move radially or axially between locked positions and unlocked positions instead of through rotation as shown in the illustrated embodiments.

It is also contemplated that other multimode clutches may be implemented in the parallel hybrid vehicle 100 as alternatives to the multimode clutch 124 illustrated and described herein and that may be capable of operating to couple and uncouple the output shaft 122 and transmission shaft 128 as necessary to implement a power control strategy for the vehicle 100. Examples of alternative clutches may be found in U.S. Pat. No. 6,062,361 issued on May 16, 2000 to Showalter, entitled "Acceleration Sensitive Double Overrunning Clutch," U.S. Pat. No. 6,092,634 issued on Jul. 25, 2000 to Kremer et al., entitled "Compliant Cage for a Roller-Type Bi-Directional One-Way Clutch Mechanism," U.S. Pat. No. 6,290,044 issued on Sep. 18, 2001 to Burgman et al., entitled "Selectable One-Way Clutch Assembly," U.S. Pat. No. 6,745,880 issued on Jun. 8, 2004 to Yuergens, entitled "Two-Way Clutch Assembly having Selective Actuation," U.S. Pat. No. 6,832,674 issued on Dec. 21, 2004 to Blair et al., entitled "Bi-Directional Four-Mode Clutch," U.S. Pat. No. 6,814,201 issued on Nov. 9, 2004 to Thomas, entitled "Bi-Directional Axially Applied Pawl Clutch Assembly," and U.S. Pat. No. 8,051,959 issued on Nov. 8, 2011 to Eisengruber, entitled "Controllable or Selectable Bi-Directional Overrunning Coupling Assembly," each of which is expressly incorporated by reference herein. Additional alternative ratchet, spring, roller and ball, and sprag-type clutches configured to be controlled to operate in multiple coupling modes are also contemplated by the inventors as having use in parallel hybrid vehicles 100 in accordance with the present disclosure to control the coupling of the output shaft 122 and the transmission shaft 128 and implement a power distribution strategy for the internal combustion engine 120 and the electric motor 134 of the vehicle 100. For such alternative clutches, it is contemplated by the inventors that those skilled in art will be able to operatively couple the clutches between the output shaft 122 and the transmission shaft 128 in the manner disclosed herein, and to operatively connect mode-switching actuation mechanisms of the clutches to control elements as described hereinafter to control the operation of the actuation mechanisms to transition between the available operating modes of the clutches and control the power transmission in the vehicle 100 as discussed below.

Figure 7:
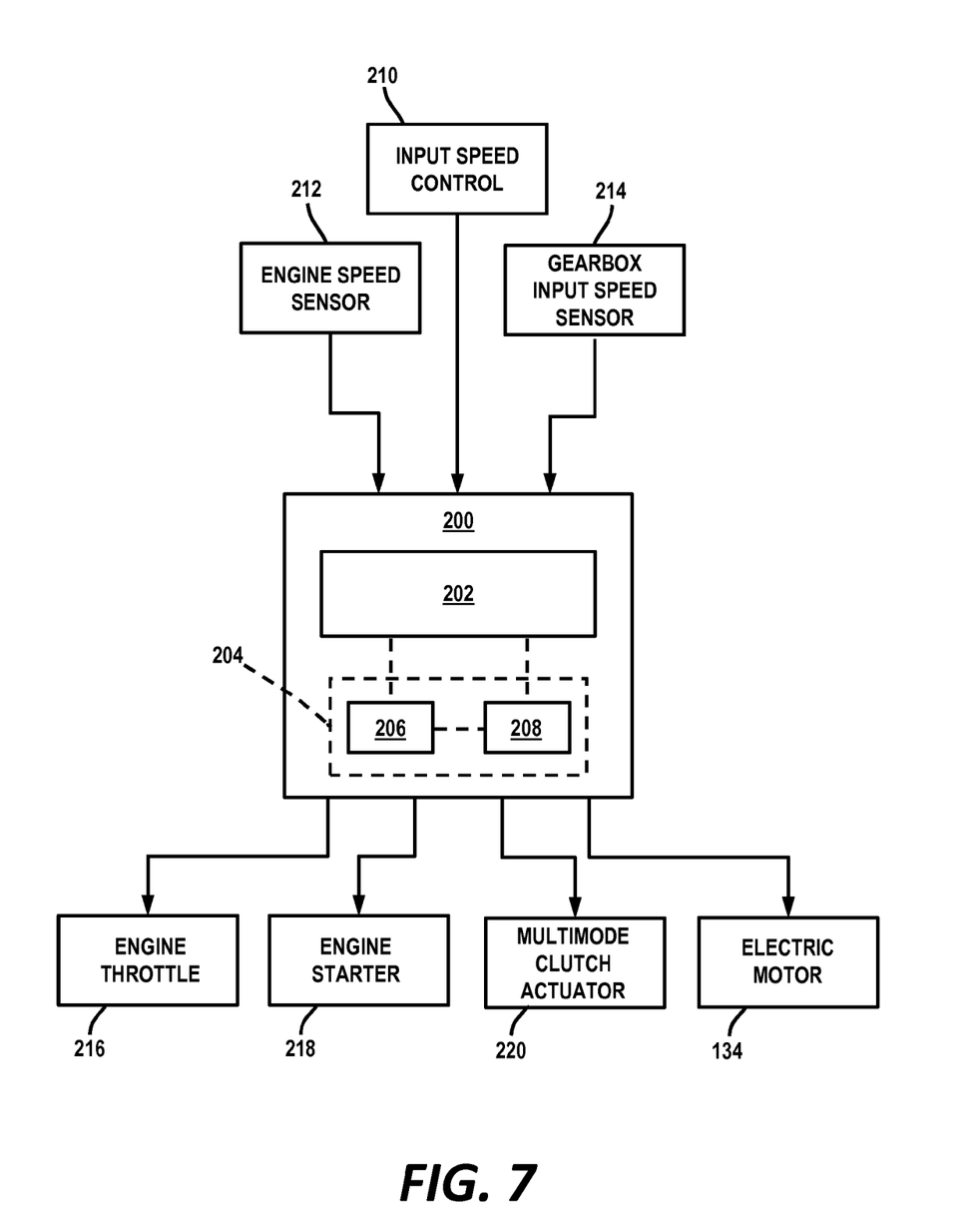
FIG. 7 is a schematic illustration of an exemplary electronic control unit and control components that may be implemented in the parallel hybrid vehicle of FIG. 2.

FIG. 7 illustrates one exemplary configuration of a controller 200 that may be implemented in the parallel hybrid vehicle 100 to control the operations of the internal combustion engine 120 and the electric motor 134 to provide power to drive the vehicle 100, and of the multimode clutch 124 for selectively entering the one-way lock, one-way unlock mode of FIG. 4, the two-way unlock mode of FIG. 5 and the two-way lock mode of FIG. 6 as necessary based on the operating conditions for the vehicle 100. The controller 200 may include a microprocessor 202 for executing specified programs that control and monitor various functions associated with the vehicle 100, including functions that are outside the scope of the present disclosure. The microprocessor 202 includes a memory 204, such as read only memory (ROM) 206, for storing a program or programs, and a random access memory (RAM) 208 which serves as a working memory area for use in executing the program(s) stored in the memory 204. Although the microprocessor 202 is shown, it is also possible and contemplated to use other electronic components such as a microcontroller, an ASIC (application specific integrated circuit) chip, or any other integrated circuit device. Although a single controller 200 for the vehicle 100 is illustrated and referenced herein, those skilled in the art will understand that the various processing functions described herein may be implemented across multiple control structures. For purposes of the present application, the controller 200 may refer collectively to the performance of the control strategy discussed herein even when implemented across multiple control devices.

The controller 200 electrically connects to the control elements of the parallel hybrid vehicle, as well as various input devices for commanding the operation of the vehicle 100 and monitoring its performance. As a result, the controller 200 may be electrically connected to input devices providing control signals to the controller 200 that may include an input speed control 210, such as a gas pedal or accelerator, that is manipulated by an operator to regulate the speed of the vehicle 100, an engine speed sensor 212 that measures the output speed of the engine 120, such as a rotary speed sensor measuring the rotational speed of the output shaft 122, and a gearbox input speed sensor 214 that measures the rotational speed input to the transmission or gearbox 126, such as a rotary speed sensor measuring the rotational speed of the transmission shaft 128. The controller 200 may also be electrically connected to output devices to which control signals are transmitted and from which control signals may be received by the controller 200, such as, for example, the electric motor 134 of the vehicle 100, an engine throttle 216 that may control the speed of the engine 120, an engine starter 218 that may be configured to start up and shut down the engine 120 as the vehicle 100 is driven, and a multimode clutch actuator 220 that may be part of the actuation mechanism that moves the multimode clutch 124 between the various operating modes of FIGS. 4-6.

An operator of the parallel hybrid vehicle 100 may manipulate the input speed control 210 to generate and transmit control signals to the controller 200 with commands indicating a desired increase or decrease in the speed of the vehicle 100, and the speed sensors 212, 214 generate and transmit control signals indicating the current speed of the engine 120 and of the transmission shaft 128 at the output of the multimode clutch 124. The controller 200 may then determine any necessary changes for the operational states of the engine 120 and the electric motor 134 and transmit appropriate control signals to the engine throttle 216, the engine starter 218 and the motor 134, and transmit control signals to the multimode clutch actuator 220 if necessary to change the mode of the multimode clutch 124 as discussed further below. Those skilled in the art will understand that the input devices, output devices and operations of the controller 200 described herein are exemplary only, and that additional and alternative devices may be implemented in parallel hybrid vehicles 100 in accordance with the present disclosure to monitor the operations of the vehicles 100 and inputs provided by operators of the vehicles 100, and to control the engine 120, the electric motor 134, the multimode clutch 124 and other systems of the vehicle 100 to operate in a desired manner.

INDUSTRIAL APPLICABILITY

Integration of the multimode clutch 124 into the parallel hybrid vehicle 100 may allow for simplifying the configuration of the controller 200 to control the multimode clutch actuator 220, as well as reducing the cycling of the multimode clutch 124 in comparison to the exemplary vehicle 10 having the engine 30 selectively connected to the transmission shaft 38 by the friction clutch 34. The multimode clutch 124 serves as a direct replacement for the friction clutch 34, and offers the three operating modes discussed above: a one-way lock, one-way unlock mode (FIG. 4) wherein the multimode clutch 124 locks in one direction and freewheels in the opposite direction; a two-way unlock mode (FIG. 5) wherein the multimode clutch 124 freewheels in both directions; and a two-way lock mode (FIG. 6) wherein the multimode clutch 124 is locked in both directions. The controller 200 may cause the multimode clutch 124 via the multimode clutch actuator 220 to alternate between the available operating modes based on the desired and/or experienced vehicle operation conditions. The specific strategy for operating the engine 120, the electric motor 134 and the multimode clutch 124 to utilize the power of the engine 120 and/or the electric motor 134 to drive the vehicle 100, and to selectively engage the available modes of the multimode clutch 124 to implement the strategy may vary depending on the operating requirements of the vehicle 100 and the decisions made in designing the vehicle 100 regarding the optimal strategy for maximizing the fuel efficiency of the vehicle 100. The examples set forth hereinafter are provided to illustrate options available for utilizing the flexibility provided by the multimode clutch 124 in implementing such strategies.

In a combustion power drive mode, the combustion engine 120 is on and providing power through the multimode clutch 124 to the gearbox 126 to drive the vehicle 100. In this drive mode, the controller 200 may transmit control signals to the electric motor 134 either to provide additional driving force to propel the vehicle 100 by drawing power from the battery 148, or to be driven by the power provided by the engine 120 to generate electricity and recharge the battery 148. Also during the combustion power drive mode, the controller 200 may transmit control signals to the multimode clutch actuator 220 to cause the actuation mechanism to move the actuator cam 160 to the one-way lock, one-way unlock position of FIG. 4. The multimode clutch 124 is arranged between the output shaft 122 and the transmission shaft 128 so that the multimode clutch 124 locks in the direction of rotation of the output shaft 122. Consequently, the output shaft 122 drives the transmission shaft 128 when the speed of the engine 120 is increasing or when the engine 120 is maintaining a constant speed of the vehicle 100.

When the operator of the vehicle 100 indicates a desired speed reduction of the vehicle 100 via the input speed control 210, the controller 200 receives the control signals from the input speed control 210 and transmits corresponding control signals to the engine throttle 216 to reduce the speed of the engine 120. As the engine speed is reduces, the speed of the output shaft 122 is correspondingly reduced. When the output shaft 122 is rotating at a slower rate than the transmission shaft 128, the relative motion between the shafts 122, 128 is in the unlocked direction of the multimode clutch 124, and the pawls 162 do not engage the cogs 174 of the outer race 158. This allows the transmission shaft 128 to freewheel as the vehicle 100 coasts without experience rotating losses due to engagement with the engine 120. When the operator of the vehicle 100 indicates an increase in the speed of the vehicle 100, the engine speed and, correspondingly, the speed of output shaft 122 increases and the multimode clutch 124 relocks to allow the output shaft 122 to drive the transmission shaft 128 without the necessity of changing the locking mode of the multimode clutch 124. It should be noted that the same cycling between deceleration and acceleration in the vehicle 10 requires the friction clutch 34 to be actuated from the closed locked position to the open position, and the re-actuated to from the open position backed to the closed locked position.

Depending on the vehicle 100 or the operating conditions, it may be desirable to maintain the connection between the output shaft 122 of the engine 120 and the transmission shaft 128. For example, maintaining the connection may be advantageous when it is necessary to control the speed of the vehicle 100 through engine braking while driving down very steep and long slopes. The desired speed is maintained by using the rotation losses from the engine 120 to counteract the gravitational acceleration. To accommodate these and other appropriate design considerations, the controller 200 may be configured to transmit control signals to the multimode clutch actuator 220 to place the multimode clutch 124 in the two-way locked position shown in FIG. 6 during the combustion power drive mode. The vehicle 100 operates in a similar manner as described above when the engine 120 is used to increase or maintain the speed of the vehicle 100, with the multimode clutch 124 locking the output shaft 122 and the transmission shaft 128 for rotation at the same shaft speed. In contrast, however, the multimode clutch 124 also locks the shafts 122, 128 for rotation at the same shaft speed when the operator operates the input speed control 210 to cause a reduction in the speed of the vehicle 100.

In an electric power drive mode, the electric motor 134 provides the power to the gearbox 126 for propelling the vehicle 100. The electric power drive mode may be feasible for use in situations such as low- and mid-speed operations where the electric motor 134 and the battery 138 may be sufficiently responsive and provide sufficient power to provide a drive experience similar to driving under the power of the engine 120. When the electric motor 134 takes over, the controller 200 may transmit control signals to the engine throttle 216 and the engine starter 218 that set the engine 120 to a low idle speed or even stop the engine 120 to conserve fuel. The controller 200 also transmits control signals to the multimode clutch actuator 220 to move the actuator cam 160 to the two-way unlocked position shown in FIG. 5. Despite the low speed or zero speed of the output shaft 122, the electric motor 134 can drive the transmission shaft 128 while the multimode clutch 124 allows the output shaft 122 to freewheel, and thus avoid applying any forces to the transmission shaft 128 that may result in rotation losses as the motor 134 provides power to increase or maintain the speed of the vehicle 100.

In a similar manner, the engine 120 will not create rotational losses when the controller 200 causes the electric motor 134 to reduce its power output and allow the vehicle 100 to decelerate or coast. As the vehicle 100 coasts, it is advantageous to use the momentum of the vehicle 100 and the rotation of the transmission shaft 128 to drive the motor 134 to regenerate vehicle power and return the generated power to the battery 138. With the output shaft 122 effectively disconnected from the transmission shaft 128, the engine 120 does not provide any resistance to the transmission shaft 128 that could reduce the efficiency of converting the momentum of the vehicle 100 into electrical power at the motor 134 and transferring the electrical power to the battery 138. Moreover, the arrangement of the pawls 162, 164 as the engagement mechanism in the multimode clutch 124 in accordance with the illustrated embodiment lowers the drag torque and rotational losses compared to the friction clutch 34 implemented in previous hybrid vehicles (10). The pawls 162, 164 offer substantially less surface area for the oil shear to create viscous drag when the inner race 156 and the outer race 158 rotate relative to each other as the transmission shaft 128 freewheels relative to the output shaft 122.

It is often necessary to transition on the fly from the combustion power drive mode to the electric power drive mode, and vice versa. Damage may be caused to the multimode clutch 124 by an immediate cut over from one mode to the other. Consequently, the controller 200 may be programmed to transition from one mode to the other under conditions that will not result in excessive wear and tear and stress on the components. For example, when switching from the combustion power drive mode with the multimode clutch 124 in the position of FIG. 4 or the position of FIG. 6 to the electric power drive mode with the multimode clutch 124 in the position of FIG. 5, it may be necessary to release the torque between the output shaft 122 and the transmission shaft 128 in order for the pawls 162, 164 to disengage from the notches 172 and cogs 174. The reduction may be accomplished through a combination of reducing the torque applied by the output shaft 122, and increasing the torque applied by the electric motor 134 to the transmission shaft 128. If performed effectively, the operator of the vehicle 100 will not notice the transition from the engine 120 to the motor 134. The controller 200 may be programmed to simultaneously transmit control signals to the engine throttle 216 to reduce the engine speed and transmit control signals to the electric motor 134 to increase the speed and power output of the motor 134. At the same time, the controller 200 may receive and monitor the control signals from the engine speed sensor 212 and gearbox input speed sensor 214 to determine the appropriate time to switch the multimode clutch 124. Once the controller 200 determines that the differential speed between output shaft 122 and the transmission shaft 128 indicates that the pawls 162, 164 can disengage without damaging the multimode clutch 124, the controller 200 transmits control signals to the multimode clutch actuator 220 to cause the clutch actuator mechanism to move the actuator cam 160 from the position of FIG. 4 or 6 to the position of FIG. 5.

When it is necessary to transition from the electric power drive mode and the multimode clutch position of FIG. 5 to the combustion power drive mode and the engagement between the output shaft 122 and the transmission shaft 128 provided by the multimode clutch positions of FIG. 4 or 6, it may be necessary to increase the engine speed and the speed of the output shaft 122 to match the speed of the transmission shaft 128. The controller 200 may start the transition by transmitting control signals to the engine throttle 216 and the engine starter 218 to restart the engine 120 and increase the speed of the output shaft 122 to match the speed of the transmission shaft 128. As the engine speed increases, the controller 200 may receive the control signals from the engine speed sensor 212 and gearbox input speed sensor 214 and compare the speed of the output shaft 122 to the transmission shaft 128. Once the controller 200 determines that the speeds of output shaft 122 and the transmission shaft 128 are approximately equal, the controller 200 transmits control signals to the multimode clutch actuator 220 to cause the clutch actuator mechanism to move the actuator cam 160 from the position of FIG. 5 to the position of FIG. 4 or 6. At the same time, once the multimode clutch 124 is repositioned, the controller 200 may transmit control signals to the electric motor 134 to cause the motor 134 to reduce or eliminate the power output to the transmission shaft 128.

As set forth in the foregoing discussion, implementation of the multimode clutch 124 in the parallel hybrid vehicle 100 as a substitute for the previously known friction clutch 34 may improve the efficiency of the vehicle 100. The multimode clutch 124 may improve the system efficiency of the parallel hybrid vehicle 100 due the reduction in rotating losses achieved when the multimode clutch 124 is in the one-way locked, one-way unlocked position of FIG. 4 to allow the transmission shaft 128 to freewheel relative to the output shaft 122 when the coasts or decelerates. The additional clutch position also reduces the number of cycles of switching between clutch positions required to alternate between the shafts 122, 128 being locked to drive the vehicle 100 and being unlocked to decelerate or coast without rotating losses as is required with the friction clutch 34. This cycle reduction may reduce the wear and tear on the multimode clutch 124 and correspondingly the need for maintenance and replacement of the multimode clutch 124, and may also simplify the control functionality required to be programmed into the controller 200.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

What is claimed is:

1. A hybrid vehicle, comprising:
    a driven wheel;
    a transmission shaft operatively connected to the driven wheel to cause the driven wheel to rotate in response to rotation of the transmission shaft;
    an electric motor operatively connected to the transmission shaft and selectively actuatable to provide power to rotate the transmission shaft;
    an internal combustion engine having an output shaft; and
    a multimode clutch operatively connected to the transmission shaft and the output shaft of the internal combustion engine, wherein the multimode clutch has a first mode wherein the multimode clutch allows the output shaft and the transmission shaft to rotate independently of each other in both directions, and a second mode wherein the multimode clutch operatively couples the output shaft to the transmission shaft so that the output shaft and the transmission shaft rotate together in one direction and allows the output shaft and the transmission shaft to rotate independently of each other in an opposite direction;
    a multimode clutch actuator operatively connected to the multimode clutch and configured to selectively place the multimode clutch in the first mode and the second mode; and
    a controller operatively connected to the electric motor and the multimode clutch actuator, the controller being configured to transmit clutch mode control signals to the multimode clutch actuator to cause the multimode clutch actuator to place the multimode clutch in the first mode and the second mode;
    a first speed sensor operatively connected to the internal combustion engine and to the controller, and configured to detect an engine speed of the internal combustion engine and to transmit first speed sensor signals to the controller having values corresponding to the detected engine speed;
    a second speed sensor operatively connected to the transmission shaft and to the controller, and configured to detect a shaft speed of the transmission shaft and to transmit second speed sensor signals to the controller having values corresponding to the detected shaft speed; and
    an engine throttle operatively connected to the internal combustion engine and to the controller, and configured to receive engine throttle control signals from the controller having values corresponding to a desired engine speed for the internal combustion engine and to cause the internal combustion engine to operate at the desired engine speed of the engine throttle control signals,
    wherein the controller is configured to determine that the multimode clutch is to transition from the second mode to the first mode, to transmit engine speed control signals to the engine throttle with the desired engine speed being less than the detected engine speed in response to determining that the multimode clutch is to transition from the second mode to the first mode, to compare the detected engine speed to the detected shaft speed, and to transmit clutch mode control signals to the multimode clutch actuator to place the multimode clutch in the first mode in response to determining that the detected engine speed is different than the detected shaft speed by a predetermined differential speed.

2. The hybrid vehicle according to claim 1, wherein the controller is configured to transmit motor control signals to the electric motor to cause the electric motor to increase a power output to the transmission shaft in response to determining that the multimode clutch is to transition from the second mode to the first mode.

3. The hybrid vehicle according to claim 1, comprising:
    a first speed sensor operatively connected to the internal combustion engine and to the controller, and configured to detect an engine speed of the internal combustion engine and to transmit first speed sensor signals to the controller having values corresponding to the detected engine speed;
    a second speed sensor operatively connected to the transmission shaft and to the controller, and configured to detect a shaft speed of the transmission shaft and to transmit second speed sensor signals to the controller having values corresponding to the detected shaft speed; and
    an engine throttle operatively connected to the internal combustion engine and to the controller, and configured to receive engine throttle control signals from the controller having values corresponding to a desired engine speed for the internal combustion engine and to cause the internal combustion engine to operate at the desired engine speed of the engine throttle control signals, wherein the controller is configured to determine that the multimode clutch is to transition from the first mode to the second mode, to transmit engine speed control signals to the engine throttle with the desired engine speed being greater than the detected engine speed in response to determining that the multimode clutch is to transition from the first mode to the second mode, to compare the detected engine speed to the detected shaft speed, and to transmit clutch mode control signals to the multimode clutch actuator to place the multimode clutch in the second mode in response to determining that the detected engine speed is approximately equal to the detected shaft speed.

4. The hybrid vehicle according to claim 1, wherein the multimode clutch comprises:

an inner race comprising pair of inner race plates defining an axis, the pair of inner race plates extending radially about the axis and being axially spaced apart, each of the pair of inner race plates including a plurality of circumferentially spaced pawl apertures;

an outer race radially disposed about the axis, and extending circumferentially about the axis and between the pair of inner race plates;

opposed pairs of pawls supported within the plurality of circumferentially spaced pawl apertures, the opposed pairs of pawls being angularly movable within the pair of inner race plates; and an actuator cam situated orthogonally to the axis, and adapted for limited angular movement about the axis, wherein in a first selectable actuator cam position corresponding to the first mode, the actuator cam engages the opposed pairs of pawls to prevent the opposed pairs of pawls from engaging the outer race and permit the inner race to rotate in both a first rotational direction and a second rotational direction independent of the outer race; and wherein in a second selectable actuator cam position corresponding to the second mode, the rotation of the pair of inner race plates in the first rotational direction causes the first of the opposed pairs of pawls to engage the outer race and thereby lock the inner race and the outer race together for rotation in the first rotational direction, and the actuator cam engages the second of the opposed pairs of pawls to prevent the second of the opposed pairs of pawls from engaging the outer race and permit the inner race to rotate in the second rotational direction independent of the outer race.

5. The hybrid vehicle according to claim 4, wherein the outer race comprises a plurality of circumferentially spaced radially inwardly depending cogs within an inner periphery thereof, each pair of cogs defining a notch there between, wherein the opposed pairs of pawls enter into the notches of the outer race and engage corresponding cogs to lock the inner race and the outer race together.

6. The hybrid vehicle according to claim 4, comprising:

a multimode clutch actuator operatively connected to the actuator cam and configured to selectively place the actuator cam in the first selectable actuator cam position and the second selectable actuator cam position; and a controller operatively connected to the electric motor and the multimode clutch actuator, the controller being configured to transmit clutch mode control signals to the multimode clutch actuator to cause the multimode clutch actuator to place the multimode clutch in the first selectable actuator cam position and the second selectable actuator cam position.

7. A hybrid vehicle, comprising:

a driven wheel;

a transmission shaft operatively connected to the driven wheel to cause the driven wheel to rotate in response to rotation of the transmission shaft;

an electric motor operatively connected to the transmission shaft and selectively actuatable to provide power to rotate the transmission shaft;

an internal combustion engine having an output shaft;

a multimode clutch comprising:

a first race defining an axis, the first race including a plurality of circumferentially spaced pawl apertures, wherein one of the output shaft and the transmission shaft is operatively connected to the first race for rotation therewith, a second race radially disposed about the axis, and extending circumferentially about the axis, wherein the other one of the output shaft and the transmission shaft is operatively connected to the second race (158) for rotation therewith, opposed pairs of pawls supported within the plurality of circumferentially spaced pawl apertures, the opposed pairs of pawls being angularly movable within the pawl apertures, and an actuator cam situated orthogonally to the axis, and adapted for limited angular movement about the axis, wherein in a first selectable actuator cam position corresponding to a first mode of the multimode clutch, the actuator cam engages the opposed pairs of pawls to prevent the opposed pairs of pawls from engaging the second race and permit the first race to rotate in both a first rotational direction and a second rotational direction independent of the second race, wherein in a second selectable actuator cam position corresponding to a second mode of the multimode clutch, rotation of the first race in the first rotational direction causes a first of the opposed pairs of pawls to engage the second race and thereby lock the first race and the second race together for rotation in the first rotational direction, and the actuator cam engages a second of the opposed pairs of pawls to prevent the second of the opposed pairs of pawls from engaging the second race and permit the first race to rotate in the second rotational direction independent of the second race, and wherein in a third selectable actuator cam position corresponding to a third mode of the multimode clutch, rotation of the first race in the first rotational direction causes the first of the opposed pairs of pawls to engage the second race and thereby lock the first race and the second race together for rotation in the first rotational direction, and rotation of the first race in the second rotational direction causes the second of the opposed pairs of pawls to engage the second race and thereby lock the first race and the second race together for rotation in the second rotational direction;

a multimode clutch actuator operatively connected to the actuator cam and configured to selectively place the actuator cam in the first selectable actuator cam position, the second selectable actuator cam position and the third selectable actuator cam position; and a controller operatively connected to the electric motor and the multimode clutch actuator, the controller being configured to transmit clutch mode control signals to the multimode clutch actuator to cause the multimode clutch actuator to place the actuator cam in the first selectable actuator cam position, the second selectable actuator cam position and the third selectable actuator cam position;
a first speed sensor operatively connected to the internal combustion engine and to the controller, and configured to detect an engine speed of the internal combustion engine and to transmit first speed sensor signals to the controller having values corresponding to the detected engine speed;
a second speed sensor operatively connected to the transmission shaft and to the controller, and configured to detect a shaft speed of the transmission shaft and to transmit second speed sensor signals to the controller having values corresponding to the detected shaft speed; and
an engine throttle operatively connected to the internal combustion engine and to the controller, and configured to receive engine throttle control signals from the controller having values corresponding to a desired engine speed for the internal combustion engine and to cause the internal combustion engine to operate at the desired engine speed of the engine throttle control signals;
wherein the controller is configured to determine that the multimode clutch is to transition from one of the second mode and the third mode to the first mode, to transmit engine speed control signals to the engine throttle with the desired engine speed being less than the detected engine speed in response to determining that the multimode clutch is to transition from one of the second mode and the third mode to the first mode, to compare the detected engine speed to the detected shaft speed, and to transmit clutch mode control signals to the multimode clutch actuator to place the actuator cam in the first selectable actuator cam position in response to determining that the detected engine speed is different than the detected shaft speed by a predetermined differential speed.

8. The hybrid vehicle according to claim 7, wherein the controller is configured to transmit motor control signals to the electric motor to cause the electric motor to increase a power output to the transmission shaft in response to determining that the multimode clutch is to transition from one of the second mode and the third mode to the first mode.

9. The hybrid vehicle according to claim 7, comprising:
a first speed sensor operatively connected to the internal combustion engine and to the controller, and configured to detect an engine speed of the internal combustion engine and to transmit first speed sensor signals to the controller having values corresponding to the detected engine speed;
a second speed sensor operatively connected to the transmission shaft and to the controller, and configured to detect a shaft speed of the transmission shaft and to transmit second speed sensor signals to the controller having values corresponding to the detected shaft speed; and
an engine throttle operatively connected to the internal combustion engine and to the controller, and configured to receive engine throttle control signals from the controller having values corresponding to a desired engine speed for the internal combustion engine and to cause the internal combustion engine to operate at the desired engine speed of the engine throttle control signals,
wherein the controller is configured to determine that the multimode clutch is to transition from the first mode to one of the second mode and the third mode, to transmit engine speed control signals to the engine throttle with the desired engine speed being greater than the detected engine speed in response to determining that the multimode clutch is to transition from the first mode to one of the second mode and the third mode, to compare the detected engine speed to the detected shaft speed, and to transmit clutch mode control signals to the multimode clutch actuator to place the actuator cam in the corresponding one of the second selectable actuator cam position and the third selectable actuator cam position in response to determining that the detected engine speed is approximately equal to the detected shaft speed.

10. The hybrid vehicle according to claim 7, wherein the second race comprises a plurality of circumferentially spaced radially inwardly depending cogs within an inner periphery thereof, each pair of cogs defining a notch there between, wherein the opposed pairs of pawls enter into the notches of the second race and engage corresponding cogs to lock the first race and the second race together.

11. A hybrid vehicle, comprising:
a driven wheel;
a transmission shaft operatively connected to the driven wheel to cause the driven wheel to rotate in response to rotation of the transmission shaft;
an electric motor operatively connected to the transmission shaft and selectively actuatable to provide power to rotate the transmission shaft;
an internal combustion engine having an output shaft; and
a multimode clutch comprising:
a first race defining an axis, wherein one of the output shaft and the transmission shaft is operatively connected to the first race for rotation therewith,
a second race radially disposed about the axis, and extending circumferentially about the axis, wherein the other one of the output shaft and the transmission shaft is operatively connected to the second race for rotation therewith,
opposed pairs of pawls operatively connected to the first race and being movable relative to the first race, and
an actuator cam adapted for movement relative to the second race,
wherein in a first selectable actuator cam position corresponding to a first mode of the multimode clutch, the actuator cam engages the opposed pairs of pawls to prevent the opposed pairs of pawls from engaging the second race and permit the first race to rotate in both a first rotational direction and a second rotational direction independent of the second race, and
wherein in a second selectable actuator cam position corresponding to a second mode of the multimode clutch, rotation of the first race in the first rotational direction causes a first of the opposed pairs of pawls to engage the second race and thereby lock the first race and the second race together for rotation in the first rotational direction, and rotation of the first race in the second rotational direction causes a second of the opposed pairs of pawls to engage the second race and thereby lock the first race and the second race together for rotation in the second rotational direction;
a multimode clutch actuator operatively connected to the actuator cam and configured to selectively place the actuator cam in the first selectable actuator cam position and the second selectable actuator cam position; and
a controller operatively connected to the electric motor and the multimode clutch actuator, the controller being configured to transmit clutch mode control signals to the multimode clutch actuator to cause the multimode clutch actuator to place the multimode clutch in the first selectable actuator cam position and the second selectable actuator cam position;

a first speed sensor operatively connected to the internal combustion engine and to the controller, and configured to detect an engine speed of the internal combustion engine and to transmit first speed sensor signals to the controller having values corresponding to the detected engine speed;

a second speed sensor operatively connected to the transmission shaft and to the controller, and configured to detect a shaft speed of the transmission shaft and to transmit second speed sensor signals to the controller having values corresponding to the detected shaft speed; and an engine throttle operatively connected to the internal combustion engine and to the controller, and configured to receive engine throttle control signals from the controller having values corresponding to a desired engine speed for the internal combustion engine and to cause the internal combustion engine to operate at the desired engine speed of the engine throttle control signals, wherein the controller is configured to determine that the multimode clutch is to transition from the second mode to the first mode, to transmit engine speed control signals to the engine throttle with the desired engine speed being less than the detected engine speed in response to determining that the multimode clutch is to transition from the second mode to the first mode, to compare the detected engine speed to the detected shaft speed, and to transmit clutch mode control signals to the multimode clutch actuator to place the actuator cam in the first selectable actuator cam position in response to determining that the detected engine speed is different than the detected shaft speed by a predetermined differential speed.

12. The hybrid vehicle according to claim 11, wherein the controller is configured to transmit motor control signals to the electric motor to cause the electric motor to increase a power output to the transmission shaft in response to determining that the multimode clutch is to transition from the second mode to the first mode.

13. The hybrid vehicle according to claim 11, comprising:
a first speed sensor operatively connected to the internal combustion engine and to the controller, and configured to detect an engine speed of the internal combustion engine and to transmit first speed sensor signals to the controller having values corresponding to the detected engine speed;

a second speed sensor operatively connected to the transmission shaft and to the controller, and configured to detect a shaft speed of the transmission shaft and to transmit second speed sensor signals to the controller having values corresponding to the detected shaft speed; and an engine throttle operatively connected to the internal combustion engine and to the controller, and configured to receive engine throttle control signals from the controller having values corresponding to a desired engine speed for the internal combustion engine and to cause the internal combustion engine to operate at the desired engine speed of the engine throttle control signals, wherein the controller is configured to determine that the multimode clutch is to transition from the first mode to the second mode, to transmit engine speed control signals to the engine throttle with the desired engine speed being greater than the detected engine speed in response to determining that the multimode clutch is to transition from the first mode to the second mode, to compare the detected engine speed to the detected shaft speed, and to transmit clutch mode control signals to the multimode clutch actuator to place the actuator cam in the second selectable actuator cam position in response to determining that the detected engine speed is approximately equal to the detected shaft speed.

14. The hybrid vehicle according to claim 11, wherein the first race includes a plurality of circumferentially spaced pawl apertures, wherein the opposed pairs of pawls are supported within the plurality of circumferentially spaced pawl apertures and are angularly movable within the plurality of circumferentially disposed pawl apertures, wherein the second race comprises a plurality of circumferentially spaced radially inwardly depending cogs within an inner periphery thereof, each pair of cogs defining a notch there between, and wherein the opposed pairs of pawls enter into the notches of the second race and engage corresponding cogs to lock the first race and the second race together.

* * * * *